Dec. 1, 1953  L. G. SAYWELL  2,661,226
SEALING ASSEMBLY
Filed July 19, 1949
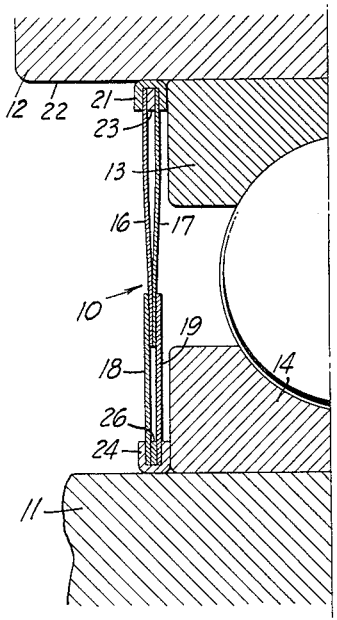
FIG_1_
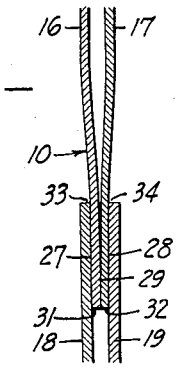
FIG_2_
FIG_3_
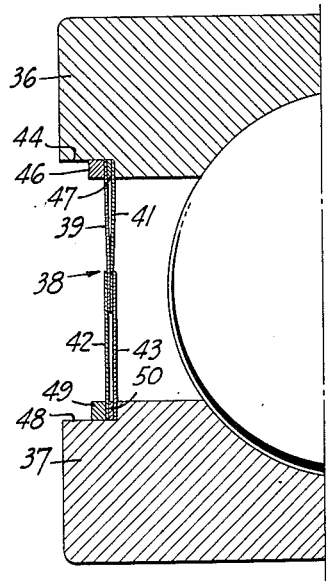
FIG_4_
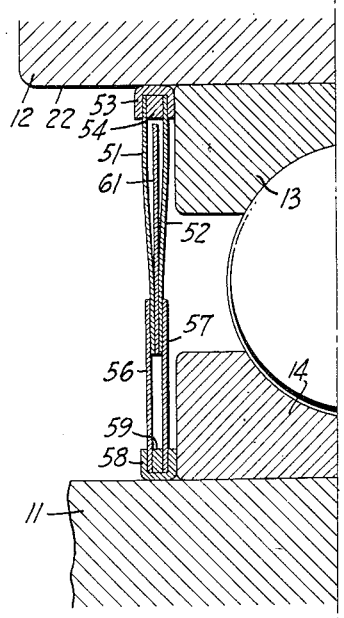
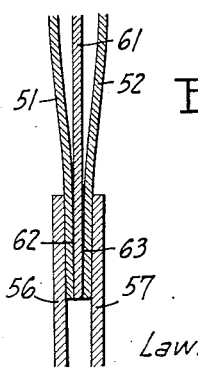
FIG_5_
INVENTOR.
Lawrence G. Saywell
BY
ATTORNEYS Patented Dec. 1, 1953

2,661,226

UNITED STATES PATENT OFFICE 2,661,226

SEALING ASSEMBLY

Lawrence G. Saywell, San Mateo, Calif., assignor to Saywell Associates, South San Francisco, Calif., a joint venture Application July 19, 1949, Serial No. 105,480

1 Claim. (Cl. 286—11)

This invention relates generally to assemblies suitable for use with relatively rotatable parts to provide a lubricant seal.

In my Patent No. 2,428,041 for "Sealing Assembly" granted September 30, 1947, there is disclosed and claimed a sealing assembly making use of relatively thin spring metal annuluses, which are stressed laterally and urged into overlapping interface sealing contact. One particular assembly illustrated in said patent (see Figure 9) makes use of a pair of spring metal annuluses which have their outer peripheral edge portions carried by mounting means, which in turn is fixed and sealed with respect to the associated shaft housing. These two annuluses have their inner peripheral margins in overlapping relation with a second pair of spring metal annuluses, which in turn have their inner peripheries carried by mounting means secured and sealed with respect to the associated shaft. All of the four annuluses are stressed laterally, whereby their overlapping margins are urged into sealing interface contact. When a sealing assembly of this type is operated at relatively high rotative speeds, there is a tendency for a vibratory or fluttering action to occur, which tends to increase friction and wear between the surfaces in rubbing contact. Such fluttering action is difficult to analyze, but according to my observations, it involves small lateral movements of the annuluses, probably in the form of wave movements which may progress in both circumferential and radial directions. It is difficult to detect the fluttering action visually, but it manifests itself by an uneven wear pattern between the surfaces in rubbing contact. The fluttering action just described tends to limit the rotative speeds with which such assemblies can be employed, and thus tends to restrict the field of application for such assemblies.

It is an object of the present invention to provide an improved assembly of the above character which can be used at relatively high rotative speeds, without undesirable fluttering action.

It is another object of the invention to provide an assembly of the above character which can be used over a wide range of rotative speeds, with development of a relatively uniform and even wear pattern between the surfaces in rubbing contact.

Another object of the invention is to provide an assembly of the above character which is not only characterized by absence of flutter at high rotative speeds, but which in addition will permit a relatively large amount of longitudinal misalignment between the shaft and the associated housing, or between the relatively rotatable parts with which the assembly is used, without interfering with the desired sealing action.

Another object of the invention is to provide an assembly of the above character which will facilitate the use of relatively thin spring metal for the outer or stator annuluses.

Additional objects of the invention will appear from the following description in which the preferred embodiments of the invention have been set forth in detail in conjunction with the accompanying drawing.

Referring to the drawing:

Figure 1 is a section, on an enlarged scale, showing a sealing assembly incorporating the present invention.

Figure 2 is an enlarged cross-sectional detail illustrating the manner in which the thin metal annuluses overlap, and are stressed to secure the results desired.

Figure 3 is a cross-sectional detail illustrating the assembly of Figures 1 and 2 applied to a ball bearing assembly.

Figure 4 is a cross-sectional view like Figure 1, but showing another embodiment of the invention.

Figure 5 is an enlarged cross-sectional detail illustrating more clearly the construction of Figure 4.

In Figure 1, one form of my sealing assembly is indicated generally at 10, and is installed between the shaft 11 and the outer associated housing 12. The journal for the shaft consists in this instance of a ball bearing assembly, including the outer and inner races 13 and 14.

The sealing assembly 10 consists of the outer spring metal annuluses 16 and 17, together with the inner spring metal annuluses 18 and 19. The outer annuluses 16 and 17 have their outer peripheral portions carried by the mounting ring 21, which is U shaped in cross-sectional contour. The mounting ring in turn has a press fit within the bore 22 of the housing 12. A spacer ring or washer 23 is interposed between the annuluses 16 and 17, and within the mounting ring 21.

The inner annuluses 18 and 19 are similarly carried by the mounting ring 24, which is U shaped in cross-sectional contour. A spacer 26 is also shown interposed between the annuluses 18 and 19.

All of the annuluses are formed of suitable spring metal, such as high carbon blue spring steel, Phosphor bronze, or one of the stainless steels. The thickness of the metal may vary according to size and operating requirements. In a typical instance the annuluses may range from 0.003 to 0.006 inch in thickness. It is desirable that the inner annuluses 18 and 19 be somewhat stiffer than the outer annuluses 16 and 17, and this may be accomplished by having the inner annuluses somewhat thicker than the outer. Thus where the outer annuluses have a thickness of 0.003 inch, the inner annuluses may have a thickness of say 0.004 to 0.005 inch. Similarly if the outer annuluses have a thickness of 0.005 inch, the inner annuluses may have a thickness of say 0.006 or 0.007 inch.

As is illustrated more clearly in Figure 2, the adjacent margins of the annuluses are in overlapping relationship, thereby providing interface contact areas 27 and 28, in sealing engagement. All of the annuluses are stressed laterally within their elastic limits, whereby the surfaces in contact, along the areas 27 and 28, are urged together to maintain the desired sealing engagement.

As a particular feature of the present invention, the stressing is such that the inner margins of the outer annuluses 16 and 17 are actually pinched and pressed together into direct physical contact along the area 29, as illustrated particularly in Figure 2. Assuming that the outer annuluses 16 and 17 are normally planar, it will be evident that they will be bent and stressed in two different directions. The portions of these annuluses extending inwardly from the mounting ring 21 will be stressed and bent toward each other, while the inner portions will be stressed with a reverse bend, as illustrated particularly in Figure 2.

In addition to pressing the outer annuluses 16 and 17 into direct physical engagement along the area 29, the stressing just described makes for a graduated loading along the areas 27 and 28. In other words the force per unit area, resulting from the pressing of the annuluses together, varies in a radial direction for the areas of overlap. More specifically, with the arrangement illustrated the greatest loading is at the outer peripheral portions of the inner annuluses 18 and 19, and decreases inwardly. Thus at the regions 31 and 32, the loading is at a minimum, or there may even be a slight spacing. However for the regions 33 and 34, the loading is at a maximum.

The assembly described above operates as follows: The contact areas 27 and 28 provide an effective seal against leakage of lubricant. A thin film of lubricant is generally present along the areas 27 and 28, which aids sealing action, and reduces friction and wear. Radial misalignment of the shaft is readily accommodated by the assembly because the inner annuluses 18 and 19 may move radially relative to the outer annuluses 16 and 17, without interfering with the sealing engagement between the overlapping portions of the annuluses. The assembly also accommodates itself to longitudinal movements of the shaft, because such movements over a substantial distance are accommodated by lateral flexing of the annuluses, without disturbing the sealing engagement between the overlapping portions of the annuluses. In this connection note that the pinching effect upon the inner margins of the outer annuluses, aids in maintaining good sealing engagement irrespective of longitudinal movement of the shaft, particularly when the inner annuluses are made relatively stiffer. This is because the inner margins of the outer annuluses, which are pinched by the inner annuluses, are retained in flat sealing engagement with the associated surfaces of the inner annuluses, whereby the longitudinal movements of the shaft are accommodated by lateral flexing of the remaining portions of the annuluses 16 and 17, extending inwardly from the mounting ring 21.

A particular feature of the present construction is that fluttering action as previously described, is greatly minimized. Thus at speeds of rotation where fluttering action would normally appear, my present assembly can be operated without any noticeable fluttering or vibration. Thus in practice it is possible to use my improved assembly over a wider range of rotative speeds, with a minimum amount of wear and friction over the entire range of operation. Minimizing or eliminating fluttering is attributed to the direct physical engagement between the inner margins of the annuluses 16 and 17, and to the fact that these margins are pressed together, which has a stiffening effect upon the outer annuluses, and which in addition interposes a damping action to suppress flutter and vibration.

Because of the improved results obtained with my construction, it is possible to utilize relatively thin and highly flexible metal for the outer annuluses 16 and 17, without causing detrimental fluttering within a given speed of operation. This is desirable in many instances because it facilitates a relatively large amount of longitudinal movement of the shaft, without interfering with proper sealing.

Figure 3 illustrates an assembly similar to that of Figure 1, except that it is incorporated directly in a ball bearing assembly. Thus in this instance the ball bearing assembly consists of the inner and outer races 36 and 37, which directly carry the sealing assembly 38. The sealing assembly is similar to that illustrated in Figure 1. Thus it includes the outer annuluses 39 and 41, and the inner annuluses 42 and 43. The outer annuluses are carried within a recess 44, and they are held in place by the pressed in retainer ring 46. A spacer ring 47 is used to space the annuluses 39 and 41 apart. The inner annuluses 42 and 43 are similarly carried within the recess 48, and they are held in place by the retaining ring 49. Here again a spacer ring 50 is shown between the annuluses 42 and 43. Annuluses 42 and 43 are stressed in such a manner as to pinch the inner margins of the annuluses 39 and 41 directly together, as illustrated in Figure 2.

It will be evident that the construction described above can be modified in various ways. For example instead of providing a spacing between the annuluses such that they will be stressed to the form illustrated in Figure 2, the annuluses 18 and 19 may be dished, and this dishing relied upon to provide sufficient stressing to pinch the inner margins of the annuluses 16 and 17 together. Suitable coating materials can be provided upon the surfaces which are in rubbing engagement. For example the inner surfaces of the annuluses 18 and 19, which contact the outer annuluses, can be coated with a flexible thermally set synthetic resin, such as disclosed in my copending application Serial No. 39,822, filed July 20, 1948 now Patent No. 2,581,301, dated January 1, 1952.

The sealing assembly described above can be used effectively for both fluid lubricants or oils and grease, although it is particularly effective for sealing against oil leakage.

One particular modification of the invention is illustrated in Figures 4 and 5. In this instance the outer annuluses 51 and 52 are carried by the mounting ring 53, in conjunction with the spacer 54, and substantially in the same manner as described with reference to Figure 1. The inner annuluses 56 and 57 are similarly carried by the mounting ring 58, in conjunction with the spacing ring 59. Interposed between the outer annuluses 51 and 52, there is an annulus 61, which can be dimensioned so that it fits loosely within the spacer ring 54. In this instance it will be apparent that the pinching action of the annuluses 56 and 57 will serve to press the inner margins of the annuluses 51 and 52 upon opposite sides of the inner margin of annulus 61. Thus instead of pressing the outer annuluses into direct contact along the area 29, as illustrated in Figure 2, they are pressed into direct engagement with the intervening annulus 61, along the areas 62 and 63 as shown in Figure 5.

In the embodiment of Figures 4 and 5 the inner annulus 61 should be made of relatively firm material, such as the same spring metal from which the outer annuluses are made, or a suitable non-metallic material such as hard fiber or a fabric reinforced condensation resin.

It should be noted that the annulus 61 is spaced from the inner faces of the annuluses 51 and 52, for the region extending between the inner margins, and the mounting ring 53. This is desirable because it facilitates lateral flexing of the annuluses 51 and 52, to accommodate longitudinal movement of the shaft.

I claim:

In a sealing assembly for sealing between relatively rotatable inner and outer aligned parts, a pair of outer spring metal annuluses having fluid-tight sealing engagement with the outer part and extending inwardly, a pair of inner spring metal annuluses having fluid-tight engagement with the inner part and extending outwardly, the two pairs of annuluses having overlapping margins, the annuluses of each pair being spaced apart for the major portion of their radial extent, one pair of annuluses being in overlapping contact with the exterior faces of the other pair, said one pair of annuluses being stressed laterally in opposite directions to press upon and pinch the interposed margins of the other pair of annuluses, the axial spacing and relative dimensions of said pairs of annuluses being such that said one pair is stiffer than said other pair and pinches and margins of the other pair into interface pressure contact for a substantial distance inwardly of the overlapped edges thereof and such that the bearing pressure between the said pairs is greatest at the free peripheral edges of said one pair of annuluses.

LAWRENCE G. SAYWELL.

References Cited in the file of this patent

UNITED STATES PATENTS

| Number | Name | Date |
| --- | --- | --- |
| 2,428,041 | Saywell | Sept. 30, 1947 |